(12) United States Patent
Channes et al.

(10) Patent No.: US 8,732,657 B2
(45) Date of Patent: May 20, 2014

(54) ODATA CONSUMPTION TOOL

(75) Inventors: Nir Channes, Tel Aviv (IL); Gil Friedman, Sunnyvale, CA (US); Alon Shachar, Hod Hasharon (IL); Boris Tsirulnik, Tel Aviv (IL)

(73) Assignee: SAP AG, Walldorf (DE)

( * ) Notice: Subject to any disclaimer, the term of this patent is extended or adjusted under 35 U.S.C. 154(b) by 82 days.

(21) Appl. No.: 13/538,536

(22) Filed: Jun. 29, 2012

(65) Prior Publication Data
US 2014/0007042 A1 Jan. 2, 2014

(51) Int. Cl.
*G06F 9/44* (2006.01)

(52) U.S. Cl.
CPC .................................. *G06F 8/30* (2013.01)
USPC .......................... 717/106; 717/104

(58) Field of Classification Search
CPC ......................................................... G06F 8/30
USPC ........................ 717/104, 106–109
See application file for complete search history.

(56) References Cited

U.S. PATENT DOCUMENTS

| 7,185,094 | B2 * | 2/2007 | Marquette et al. ............ 709/225 |
| 8,261,231 | B1 * | 9/2012 | Hirsch et al. .................. 717/100 |
| 8,307,331 | B2 * | 11/2012 | Warila et al. .................. 717/109 |
| 2003/0147369 | A1 * | 8/2003 | Singh et al. .................... 370/338 |

OTHER PUBLICATIONS

Baxter-Reynolds, "Multimobile Development Building Applications for the iPhone and Android Platforms", 2010.*

* cited by examiner

*Primary Examiner* — Phillip H Nguyen
(74) *Attorney, Agent, or Firm* — Buckley, Maschoff & Talwalkar LLC

(57) ABSTRACT

According to some embodiments, a method and apparatus are provided to receive an application type and a platform environment type. An application based on the received application type and the platform environment type is created. The application comprises an instantiation of the received application type configured for the received environment type.

14 Claims, 6 Drawing Sheets

100

Receive a pattern and a platform environment type
101

Create a template based on the received pattern and the platform environment type, where the template comprises an instantiation of the received pattern configured for the received environment type.
102

500

Receive a selection of a target environment and a selection of a service
501

Output a proxy associated with the selected service
502

ODATA CONSUMPTION TOOL

BACKGROUND

The Open Data Protocol ("OData") is an open web protocol for querying and updating data. OData allows a user to query a data source using an HTTP protocol and receive a result in a useable format. OData can be used to expose and access data from several types of data source like databases, file systems and websites.

OData can be used by a variety of technologies such as, but not limited to, .NET, Java, and Ruby. On a client side, OData may be associated with a variety of technologies such as, but not limited to, .NET, Silverlight, WP7, JavaScript, PHP, Ruby and Objective-C. This makes OData very attractive to situations where data will be accessed by a variety of different clients. However, because of the vast varieties of technologies used, services created using OData may be difficult for a user implement, difficult for a user to understand, and difficult to determine if the service is relevant for their use.

DETAILED DESCRIPTION

Figure 1:
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 8.

The method 100 may relate to creating and consuming OData based applications. In one embodiment, the method 100 may be implemented as a plugin associated with a development software application. For example, Eclipse is a development software application that may use plug-ins to provide functionality within and on top of a runtime system. Therefore, in some embodiments, the method 100 may be implemented as a plugin for Eclipse.

At 101, an application type and a platform environment type are received. An application type may comprise a reusable solution to a commonly occurring problem (e.g., a pattern). For example, the application type may comprise, but is not limited to, a list application type, a graph application type, a proxy application type, or a workflow application type each of which may be implemented by programming code. In some embodiments, an application type may be implemented using OData.

A platform environment type may comprise, but is not limited to, an Android platform, a PHP platform, a JAVA platform, or an Apple based platform. Accordingly, a platform environment type may be associated with a specific operating system and/or a specific hardware platform.

Figure 3:
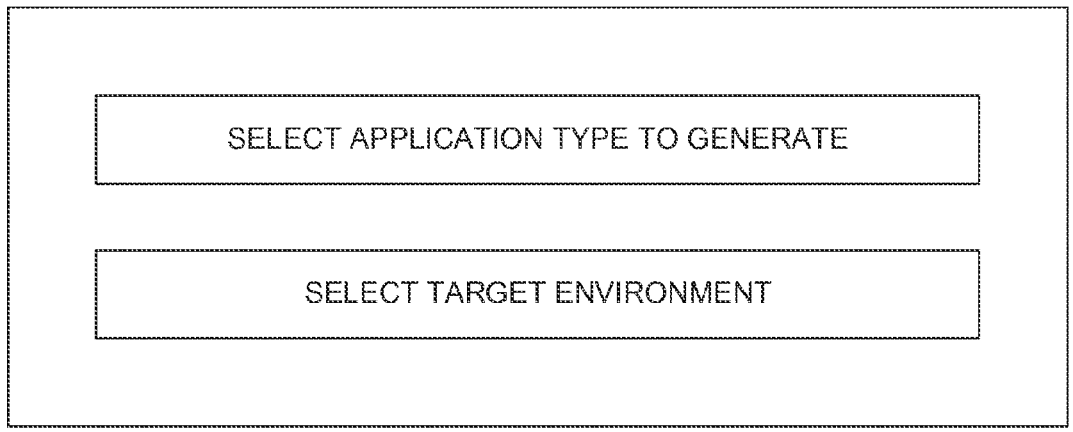
FIG. 3 illustrates a user interface according to some embodiments.

For illustrative purposes, and to aid in understanding features of the specification, an example will now be introduced. This example is not intended to limit the scope of the claims. For example, a user has a need to develop an application associated with a list application type for an Android platform. Using a development software application, such as Eclipse, the user, via a user interface, may select an application type to generate (e.g., the list application type). Furthermore, the user, via the user interface, may select a target environment of Android. An example embodiment of a user interface to receive an application type and a platform environment type is illustrated at FIG. 3.

Figure 2:
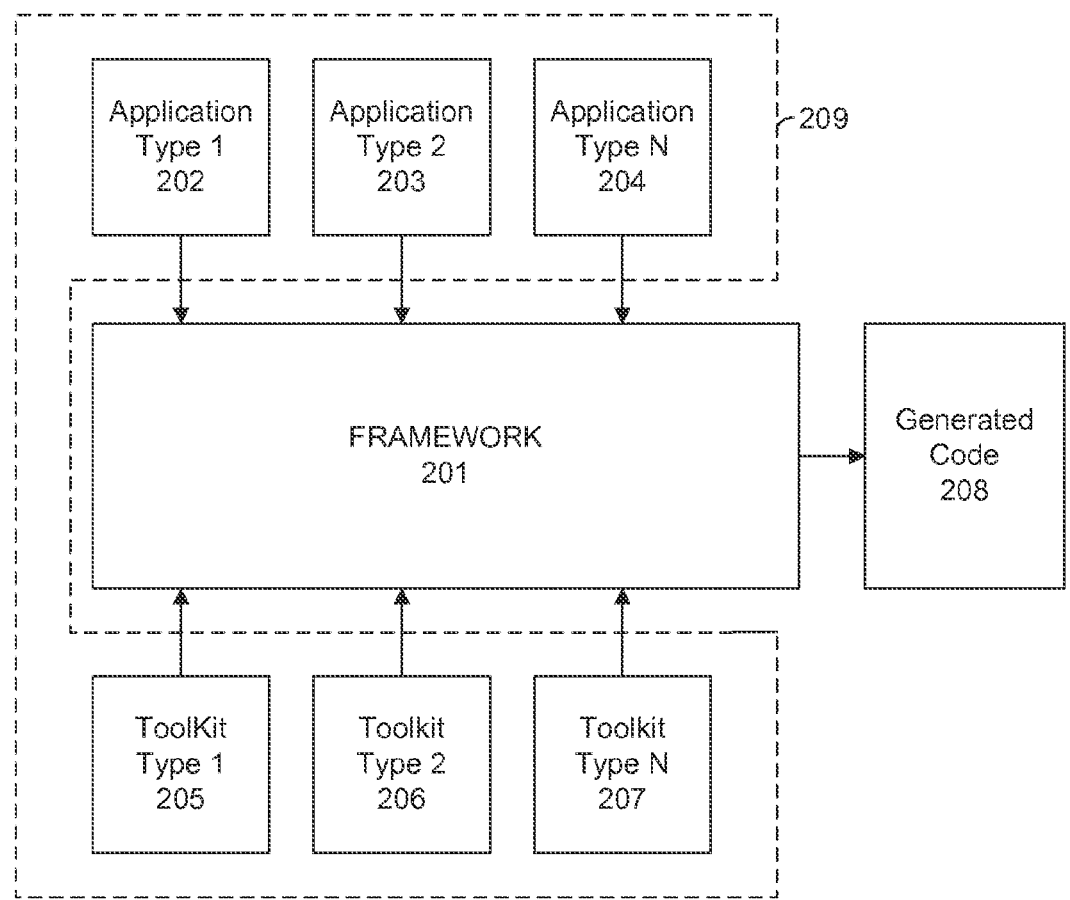
FIG. 2 illustrates an architecture according to some embodiments.

Now referring to FIG. 2, in some embodiments, after receiving an indication of an application type 202/203/204 to generate, a framework 201 may query a data source 209 to determine if the application type 202/203/204 currently exists. The framework 201 may further receive an indication of a platform environment type. Furthermore, the data source 209 may be associated with the framework 201. Likewise, the framework 209 may query the data source 209 to determine if the received platform type exists in the data source 209.

If the received application type exists, the user may be prompted to enter application specific information to create a template to model the application. For example, if a list application type is selected, the user may be prompted to enter information associated with the list such as a data type, column width, etc. If the received application type doesn't exist, the user may be prompted to enter information to create a new application type which may be saved for future use. Furthermore, a user may modify an existing application type and save this modified application type in the data source 209 as a new application type for future use.

Figure 4:
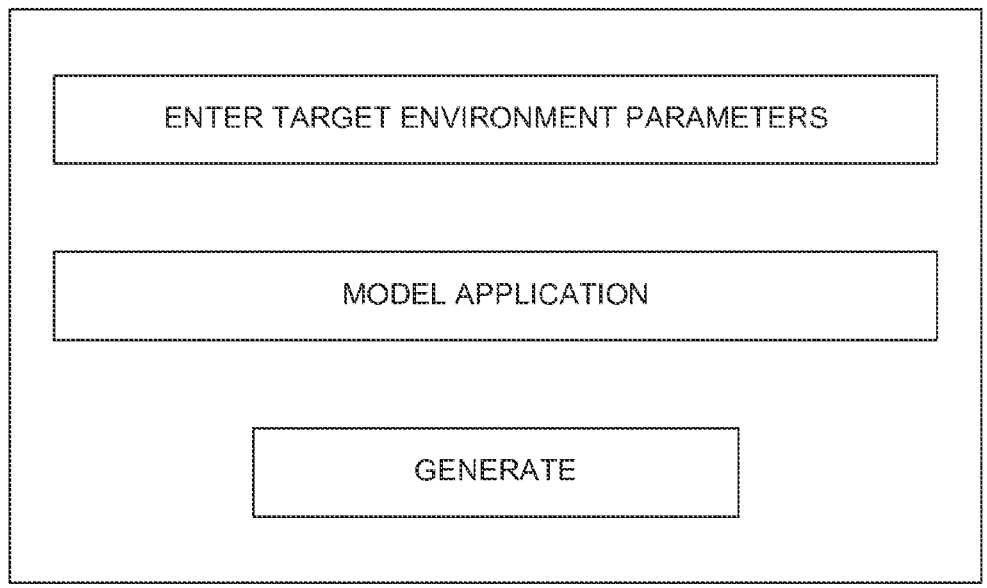
FIG. 4 illustrates a user interface according to some embodiments.

If the platform environment type exists, the user may be prompted to enter target environment parameters that are specific to the requested environment. For example, variables that control individual build options or paths to resources may be set. If the received platform environment type doesn't exist, the user may be prompted to enter information to enter data specific to a new platform environment type. An example embodiment of a user interface to enter target environment parameters and information associated with modeling an application type is illustrated at FIG. 4.

After the target environment parameters are entered, the user may initiate a generate command. For example, a user may press a generate button, such as the generate button disclosed in FIG. 4.

Referring back to FIG. 1, next, at 102, an application based on the received application type and the platform environment type is created via a processor. In some embodiments, the application may also be created based on the template that models the application. The application may be created in response to the user initiating a generate command. The application comprises an instantiation of the received application type configured for the received environment type.

Continuing with the above example, in response to receiving an indication of a list application type and an indication of an Android platform, an instantiation of a list application for the Android platform is created. This instantiation may be referred to as a toolkit which may be stored in the data source. Accordingly, stored toolkits may be searched in the data source. As illustrated in FIG. 2, toolkits 205/206/207 may be stored in the data source 209.

Since each platform environment type may be associated with platform specific code such as objects, variables, and routines, creating the application may comprise integrating the platform specific code with a template associated with the application type (e.g., pattern) to create the instantiation of the received application type configured for the received environment type.

In some embodiments, generating the application based on the received application type and the platform environment type further comprises generating programming code, such as program code 208. The programming code may be associated with a starter application (e.g., a proxy) for the generated application. A proxy, in its most general form, may comprise a class functioning as an interface to something else, a network connection, a large object in memory, a file, or some other resource.

According to some embodiments, the present embodiments allow for creation of new application types, creation of new toolkits, creation of code and creation of applications.

Figure 5:
FIG. 5 illustrates a method according to some embodiments.

Now referring to FIG. 5, an embodiment of a method 500 is illustrated. Similar to the method 100, the method 500 may be embodied on a non-transitory computer-readable medium and may be performed by an apparatus such as, but not limited to, the apparatus of FIG. 8.

Figure 6:
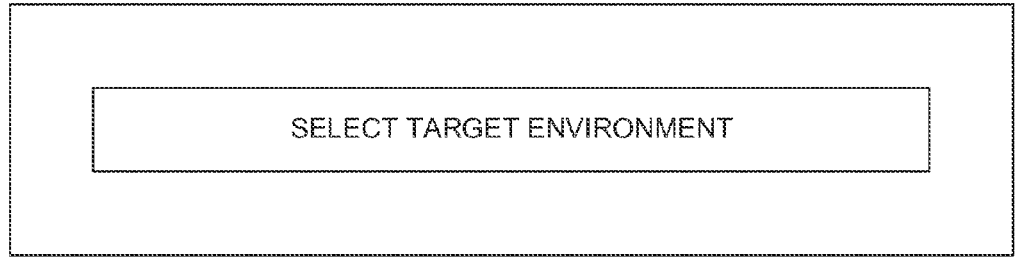
FIG. 6 illustrates a user interface according to some embodiments.
Figure 7:
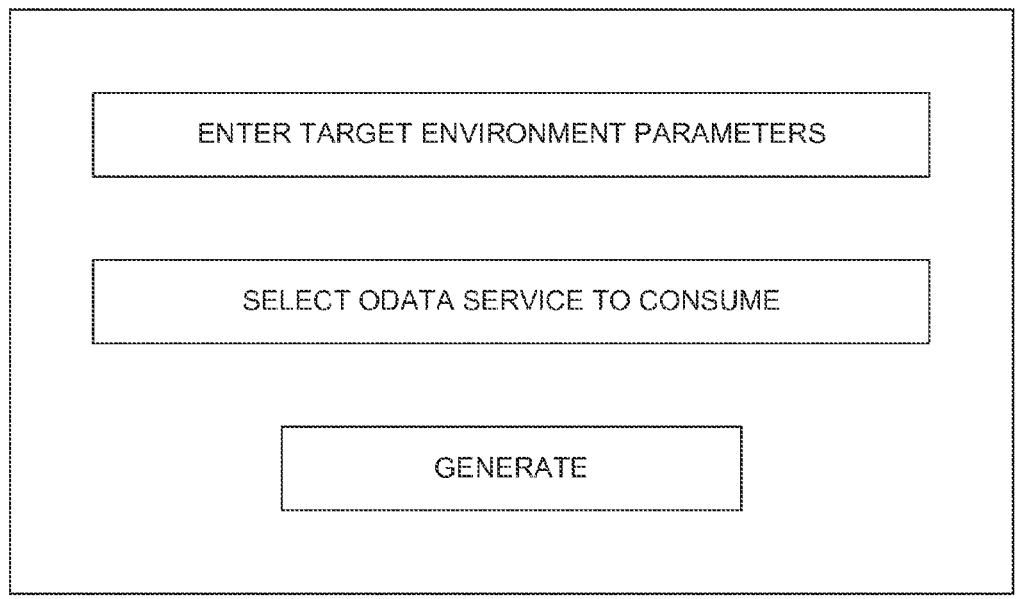
FIG. 7 illustrates a user interface according to some embodiments.

At 501, a selection of a target environment type and a selection of a service are received. Once a target environment type is selected, a frame work may query a data source to determine if the selected target environment type is supported and if extensions to support the target environment type are supported by proxy generation. User interfaces associated with receiving a selection of a target environment type and a selection of a service may be illustrated in FIG. 6 and FIG. 7.

If the target environment type is supported, a user may be prompted to enter target environment parameters that are specific to the requested environment. If the target environment type is not supported, a user may be prompted to enter information so that the target environment may be saved for future use.

A user may select which service he would like to consume using a user interface that is provided by a frame work. The service may be associated with an application, a toolkit or an application type. Furthermore, the service may comprise an OData service.

At 502, a proxy associated with the selected service and the selected target environment is output. Outputting the proxy may be in response to a user initiating a generate command at a user interface. In response to the generate command, the framework may trigger a target environment handler extension and the extension may generate the proxy for the selected service.

Figure 8:
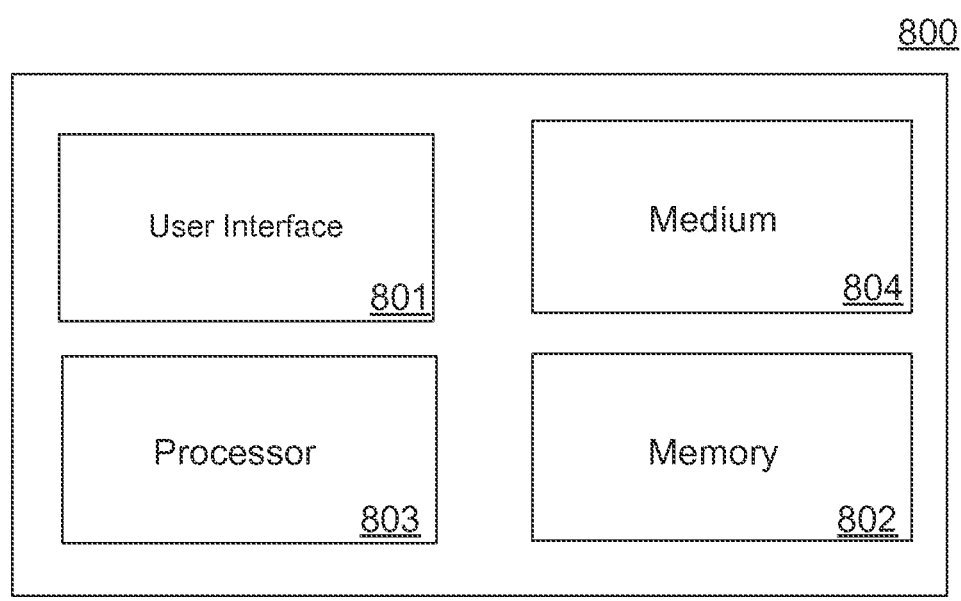
FIG. 8 illustrates a computing system according to some embodiments.

Now referring to FIG. 8, an embodiment of an apparatus 800 is illustrated. The apparatus 800 may comprise a user interface 801, a main memory 802, a processor 803, and a medium 804. According to some embodiments, the apparatus 800 may further comprise a digital display port, such as a port adapted to be coupled to a digital computer monitor, television, portable display screen, or the like.

The user interface 801 may allow users to interact with the apparatus 800 using text commands or with images/graphical icons. In some embodiments, the user interface may comprise a keyboard, mouse, or associated port related thereto. Furthermore, the user interface 801 may comprise a display or a touch screen.

The main memory 802 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 802 may comprise a plurality of memory modules.

The processor 803 may include or otherwise be associated with dedicated registers, stacks, queues, etc. that are used to execute program code and/or one or more of these elements may be shared there between. In some embodiments, the processor 803 may comprise an integrated circuit. In some embodiments, the processor 803 may comprise circuitry to perform a method such as, but not limited to, the method described with respect to FIG. 1 and/or FIG. 5.

The medium 804 may comprise any computer-readable medium that may store processor-executable instructions to be executed by the processor 803. For example, the medium 804 may comprise a non-transitory tangible medium such as, but is not limited to, a compact disk, a digital video disk, flash memory, optical storage, random access memory, read only memory, or magnetic media.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, may be stored on a tangible, machine readable medium and supplied to various customers or manufacturing facilities to load into the fabrication machines that actually make the logic or processor.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:
1. A method comprising:
  receiving an application type and a platform environment type;
  determining if the application type and the platform type exist in a data source;

if the received application type exists, prompting for application specific information to create a template to model an application;

if the received application type does not exist, prompting for information to create a new application type; and creating, via a processor, the application based on the received application type and the platform environment type, wherein the application comprises an instantiation of the received application type configured for the received environment type based on the template to model the application.

2. The method of claim 1, wherein the method is implemented as an Eclipse plugin.

3. The method of claim 1, wherein the application is implemented using OData.

4. The method of claim 1, further comprising:
generating code corresponding to the application.

5. The method of claim 1, wherein creating comprises implementing platform specific code with the template to create the instantiation of the received application type configured for the received environment type.

6. The method of claim 1, wherein if the received platform environment type exists, prompting for target environment parameters that are specific to the received platform environment type, and wherein if the received platform environment type does not exist, prompting for target environment parameters associated with modeling the received platform environment type.

7. The method of claim 1, wherein creating the application comprises generating programming code associated with a starter application functioning as a proxy.

8. A non-transitory computer-readable medium comprising instructions that when executed by a processor perform a method, the method comprising:

receiving an application type and a platform environment type;

determining if the application type and the platform type exist in a data source;

if the received application type exists, prompting for application specific information to create a template to model an application;

if the received application type does not exist, prompting for information to create a new application type; and creating, via a processor, the application based on the received application type and the platform environment type, wherein the application comprises an instantiation of the received application type configured for the received environment type based on the template to model the application, wherein the method is implemented as an Eclipse plugin and the application is implemented using OData.

9. The medium of claim 8, wherein the method further comprises:
generating code corresponding to the application.

10. The medium of claim 8, wherein the method further comprises:

if the received platform environment type exists, prompting for target environment parameters that are specific to the received platform environment type, and if the received platform environment type does not exist, prompting for target environment parameters associated with modeling the received platform environment type.

11. An apparatus comprising:

a user interface to receive an application type and a platform environment type from a user; and a processor to determine if the application type and the platform type exist in a data source and if the received application type exists, prompting for application specific information to create a template to model an application else if the received application type does not exist, prompting for information to create a new application type; and create an application based on the received application type and the platform environment type, wherein the application comprises an instantiation of the received application type configured for the received environment type based on the template to model the application, wherein the apparatus is associated with Eclipse.

12. The apparatus of claim 11, wherein the application is associated with OData.

13. The apparatus of claim 11, wherein the processor further generates code corresponding to the application.

14. The apparatus of claim 11, wherein the processor, in response to receiving the application type and platform environment type, if the received platform environment type exists, prompting for target environment parameters that are specific to the received platform environment type, and if the received platform environment type does not exist, prompting for target environment parameters associated with modeling the received platform environment type.

* * * * *